(12) United States Patent
Zhou

(10) Patent No.: US 9,805,758 B2
(45) Date of Patent: Oct. 31, 2017

(54) DVD NAVIGATOR BASED ON A VEHICLE-MOUNTED TERMINAL CAPABLE OF UNLOADING DISC IN THE SLEEP STATE

(71) Applicant: AutoChips Inc., Hefei, Anhui Province (CN)

(72) Inventor: Jian Zhou, Hefei (CN)

(73) Assignee: AUTOCHIPS INC., Hefei, Anhui Province (CN)

( * ) Notice: Subject to any disclaimer, the term of this patent is extended or adjusted under 35 U.S.C. 154(b) by 0 days.

(21) Appl. No.: 15/147,981

(22) Filed: May 6, 2016

(65) Prior Publication Data
US 2016/0329076 A1    Nov. 10, 2016

(30) Foreign Application Priority Data

May 6, 2015    (CN) .......................... 2015 1 0227158

(51) Int. Cl.
*H04B 1/20*    (2006.01)
*G11B 17/04*    (2006.01)
(Continued)

(52) U.S. Cl.
CPC .......... *G11B 17/0402* (2013.01); *G11B 7/085* (2013.01); *G11B 17/05* (2013.01);
(Continued)

(58) Field of Classification Search
None
See application file for complete search history.

(56) References Cited

U.S. PATENT DOCUMENTS

| 6,775,467 | B1* | 8/2004 | Su | ........................ | G11B 27/105 348/E5.101 |
| 2003/0215224 | A1* | 11/2003 | Yoo | ...................... | G11B 27/105 386/231 |

(Continued)

FOREIGN PATENT DOCUMENTS

| CN | 1338741 A | 3/2002 |
| CN | 201134250 Y | 10/2008 |

(Continued)

OTHER PUBLICATIONS

CN 203151377, Pub date Aug. 21, 2013 (English translation document).*

(Continued)

*Primary Examiner* — Tan X Dinh
(74) *Attorney, Agent, or Firm* — Cheng-Ju Chiang

(57) ABSTRACT

A DVD navigator based on a vehicle-mounted terminal is disclosed. The DVD navigator includes: a menu panel module, configured to generate a first level in response to reception of an unload instruction; and a quick-unload module, configured to acquire the first level in a sleep state of the DVD navigator and process the first level to generate a second level and a pulse signal so as to control the DVD navigator to quickly unload a disc according to the second level in the sleep state. By the aforesaid way, the present disclosure can effectively reduce the unload time of the DVD navigator by controlling the DVD navigator to quickly unload a disc in the sleep state after receiving the unload instruction.

13 Claims, 2 Drawing Sheets

(51) Int. Cl.
  *G11B 17/05* (2006.01)
  *G11B 17/056* (2006.01)
  *G11B 27/10* (2006.01)
  *H04H 20/10* (2008.01)
  *G11B 17/051* (2006.01)
  *G11B 7/085* (2006.01)

(52) U.S. Cl.
  CPC .......... *G11B 17/051* (2013.01); *G11B 17/056* (2013.01); *G11B 27/105* (2013.01); *H04B 1/205* (2013.01); *H04B 1/207* (2013.01); *H04H 20/106* (2013.01)

(56) References Cited

U.S. PATENT DOCUMENTS

| | | | |
|---|---|---|---|
| 2004/0117647 A1* | 6/2004 | Ballard | G11B 20/00007 726/29 |
| 2008/0316873 A1* | 12/2008 | Robey | G11B 19/02 369/30.32 |
| 2009/0319341 A1 | 12/2009 | Berkobin et al. | |
| 2011/0181540 A1* | 7/2011 | Nakamura | G01C 21/26 345/173 |
| 2012/0063283 A1 | 3/2012 | Chen | |

FOREIGN PATENT DOCUMENTS

| | | |
|---|---|---|
| CN | 201435214 Y | 3/2010 |
| CN | 102081940 A | 6/2011 |
| CN | 202363115 U | 8/2012 |
| CN | 203786661 U | 8/2014 |
| CN | 204045208 U | 12/2014 |
| JP | 2003294459 A * | 10/2003 |

OTHER PUBLICATIONS

CN 203151376, Pub date Aug. 21, 2013 (English translation document).*

* cited by examiner

DVD NAVIGATOR BASED ON A VEHICLE-MOUNTED TERMINAL CAPABLE OF UNLOADING DISC IN THE SLEEP STATE

FIELD OF THE INVENTION

The present disclosure generally relates to the technical field of electronics, and more particularly, to a DVD navigator based on a vehicle-mounted terminal.

BACKGROUND OF THE INVENTION

For digital versatile disc (DVD) navigators based on vehicle-mounted terminals, there are two ways to control loading and unloading of discs thereof. The first way is by means of an external microcontroller unit (MCU), but this way requires users to develop on their own processing code for loading or unloading the discs. The second way is by means of a DVD module owned by the vehicle-mounted terminals, where the users can directly invoke interfaces of the DVD navigators. Currently, the function of loading and unloading of discs of the DVD navigators is mainly controlled in the second way because the second way can save the software development cost for the users and release port resources of the MCU. However, one drawback of the second way lies in that: when the DVD module is in a sleep state, the disc cannot be immediately unloaded by pressing a Load/Unload button and can only be unloaded after the DVD module is awakened. The process of awakening the DVD module usually takes a relatively long time of 2-3 seconds, and this is inclined to degrade user experiences.

Accordingly, it is necessary to provide a DVD navigator based on a vehicle-mounted terminal to solve the aforesaid problems.

SUMMARY OF THE INVENTION

A primary technical problem to be solved by the present disclosure is to provide a DVD navigator based on a vehicle-mounted terminal in order to solve the problem that the DVD navigator cannot unload a disc rapidly when in a sleep state.

To solve the aforesaid technical problem, one technical solution adopted by the present disclosure is to provide a DVD navigator based on a vehicle-mounted terminal. The DVD navigator comprises: a menu panel module configured to generate a first level in response to reception of an unload instruction; and a quick-unload module configured to acquire and process the first level in a sleep state of the DVD navigator to generate a second level and a pulse signal to control the DVD navigator to quickly unload a disc according to the second level in the sleep state.

Typically, the DVD navigator may further comprise a motor module configured to control a motor to rotate according to the second level to control the quick-unload to quickly unload the disc in the sleep state.

Typically, the DVD navigator may further comprise a DVD module configured to awaken the DVD navigator after acquiring the pulse signal in the sleep state of the DVD navigator, and meanwhile, to supply power to the motor module.

Typically, the DVD module may further be configured to, when the first level is acquired in a normal operation state of the DVD navigator, supply power to the motor module and control the motor of the motor module to rotate to unload the disc.

Typically, the menu panel module may comprise a first resistor, a button switch, and an electrolytic capacitor. The button switch may have a terminal thereof connected to a voltage source via the first resistor and the other terminal thereof connected respectively to a positive electrode of the electrolytic capacitor and the quick-unload module, wherein a negative electrode of the electrolytic capacitor is connected to the ground. The menu panel module may generate the first level when the button switch is closed and output the first level through discharging of the electrolytic capacitor when the button switch is opened.

Typically, the quick-unload module may comprise a second resistor, a third resistor, a fourth resistor, a fifth resistor, a first transistor, a second transistor and a third transistor, where the first transistor has a first pin thereof connected respectively to the other terminal of the button switch and to a first pin of the second transistor, a second pin thereof connected to the voltage source via the second resistor, and a third pin thereof connected to the ground via the third resistor, the second transistor has a second pin thereof connected to the voltage source via the fourth resistor and a third pin thereof connected to a third pin of the third transistor, the third transistor has a second pin thereof connected to the ground via the fifth resistor and a first pin thereof connected to a position detection terminal, and the position detection terminal may output a low level when the disc has not been completely unloaded from the DVD navigator and output a high level when the disc has been completely unloaded from the DVD navigator. The DVD module may be connected to the second pin of the first transistor, the motor module is connected to the second pin of the third transistor, and when the first level is acquired by the quick-unload module from the menu panel module, the first transistor, the second transistor and the third transistor may be turned on so that the DVD module can acquire the pulse signal from the second pin of the first transistor, awaken the DVD navigator from the sleep state and supply power to the motor module; and meanwhile, the quick-unload module may generate the second level at the second pin of the third transistor to the motor module so as to control the DVD navigator to quickly unload the disc in the sleep state.

Typically, the DVD module may be connected to the first pin of the first transistor so that when the first level is acquired by the DVD module from the menu panel module, the DVD module can supply power to the motor module and control the motor of the motor module to rotate to unload the disc.

Typically, the first transistor and the second transistor may each be an NPN transistor, the third transistor may be a PNP transistor, the first pin of the first transistor and the first pin of the second transistor may be base electrodes of the respective NPN transistors, the second pin of the first transistor and the second pin of the second transistor may be collector electrodes of the respective NPN transistors, the third pin of the first transistor and the third pin of the second transistor may be emitter electrodes of the respective NPN transistors, the first pin of the third transistor may be a base electrode of the PNP transistor, the second pin of the third transistor may be a collector electrode of the PNP transistor, and the third pin of the third transistor may be an emitter electrode of the PNP transistor.

Typically, the first transistor and the second transistor may each be an N-type MOS transistor, the third transistor may be a P-type MOS transistor, the first pin of the first transistor and the first pin of the second transistor may be gate electrodes of the respective N-type MOS transistors, the second pin of the first transistor and the second pin of the second transistor may be drain electrodes of the respective N-type MOS transistors, the third pin of the first transistor and the third pin of the second transistor may be source electrodes of the respective N-type MOS transistors, the first pin of the third transistor may be a gate electrode of the P-type MOS transistor, the second pin of the third transistor may be a drain electrode of the P-type MOS transistor, and the third pin of the third transistor may be a source electrode of the P-type MOS transistor.

Typically, the quick-unload module may comprise a second resistor, a third resistor, a fourth resistor, a first transistor and a second transistor, the first transistor may have a first pin thereof connected respectively to the other terminal of the button switch and a terminal of the second resistor, the other terminal of the second resistor may be connected to the ground, the first transistor may have a second pin thereof connected to the voltage source via the third resistor and a third pin thereof connected to a third pin of the second transistor, the second transistor may have a second pin thereof connected to the ground via the fourth resistor and a first pin thereof connected to a position detection terminal, and the position detection terminal may output a low level when the disc has not been completely unloaded from the DVD navigator and output a high level when the disc has been completely unloaded from the DVD navigator. The second pin of the second transistor may be respectively connected to the DVD module and the motor module, and when the first level is acquired by the quick-unload module from the menu panel module, the first transistor and the second transistor may be turned on so that the DVD module can acquire the pulse signal from the second pin of the second transistor, awaken the DVD navigator from the sleep state and supply power to the motor module; and meanwhile, the second pin of the second transistor may generate the second level to the motor module so as to quickly unload the disc in the sleep state.

Typically, the DVD module may be connected to the first pin of the first transistor so that when the first level is acquired by the DVD module from the menu panel module, the DVD module can supply power to the motor module and controls the motor of the motor module to rotate so as to unload the disc.

Typically, the first transistor may be an NPN transistor, the second transistor may be a PNP transistor, the first pin of the first transistor may be a base electrode of the NPN transistor, the second pin of the first transistor may be a collector electrode of the NPN transistor, the third pin of the first transistor may be an emitter electrode of the NPN transistor, the first pin of the second transistor may be a base electrode of the PNP transistor, the second pin of the second transistor may be a collector electrode of the PNP transistor, and the third pin of the second transistor may be an emitter electrode of the PNP transistor.

Typically, the first transistor may be an N-type MOS transistor, the second transistor may be a P-type MOS transistor, the first pin of the first transistor may be a gate electrode of the N-type MOS transistor, the second pin of the first transistor may be a drain electrode of the N-type MOS transistor, the third pin of the first transistor may be a source electrode of the N-type MOS transistor, the first pin of the second transistor may be a gate electrode of the P-type MOS transistor, the second pin of the second transistor may be a drain electrode of the P-type MOS transistor, and the third pin of the second transistor may be a source electrode of the P-type MOS transistor.

As compared to the prior art, the present disclosure has the following benefits: the DVD navigator according to the present disclosure comprises a menu panel module and a quick-unload module, the menu panel module is configured to generate a first level in response to reception of an unload instruction; and the quick-unload module is configured to acquire the first level in a sleep state of the DVD navigator and process the first level to generate a second level and a pulse signal so as to control the DVD navigator to quickly unload a disc according to the second level in the sleep state. Thus, the present disclosure can effectively reduce the unload time of the DVD navigator and significantly improve the user experiences by controlling the DVD navigator to quickly unload a disc in the sleep state after receiving the unload instruction.

DETAILED DESCRIPTION OF THE INVENTION

Figure 1:
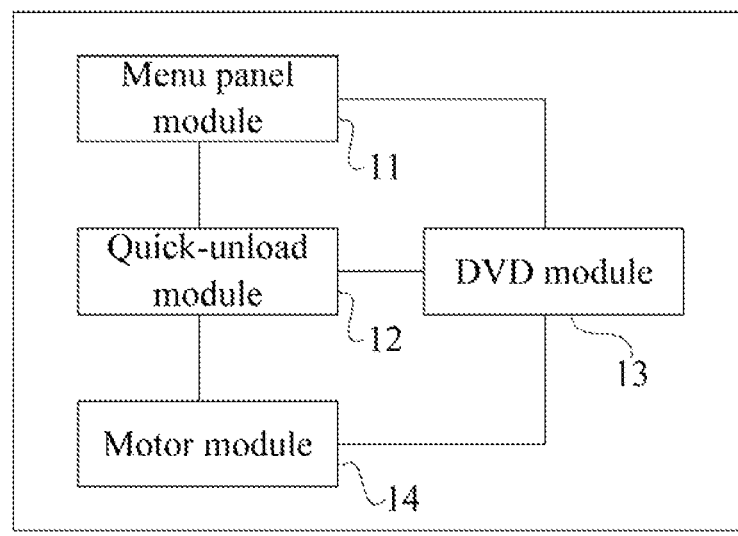
FIG. 1 is a schematic structural view of a DVD navigator based on a vehicle-mounted terminal according to the present disclosure.
Figure 2:
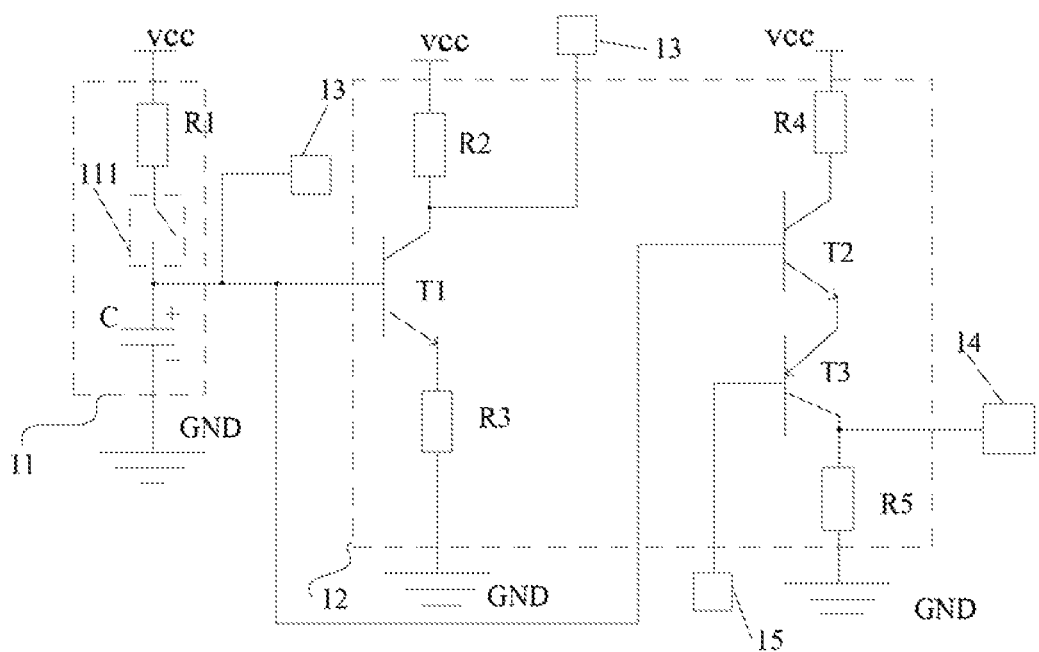
FIG. 2 is a schematic circuit diagram of a DVD navigator based on a vehicle-mounted terminal according to a first embodiment of the present disclosure.

Referring to FIG. 1 and FIG. 2 together, FIG. 1 is a schematic structural view of a DVD navigator based on a vehicle-mounted terminal according to the present disclosure, and FIG. 2 is a schematic circuit diagram of the DVD navigator based on a vehicle-mounted terminal according to the present disclosure. The DVD navigator is installed in, but not limited to, a vehicle-mounted terminal (not shown); and the DVD navigator may also be installed in other electronic apparatuses, e.g., airplanes, ships or other apparatuses. The DVD navigator comprises a menu panel module 11, a quick-unload module 12, a DVD module 13 and a motor module 14.

The menu panel module 11 is configured to generate a first level in response to reception of an unload instruction. Specifically, as shown in FIG. 2, the menu panel module 11 comprises a first resistor R1, a button switch 111 and an electrolytic capacitor C. The button switch 111 has a terminal thereof connected to a voltage source vcc via the first resistor R1 and the other terminal thereof connected respectively to a positive electrode of the electrolytic capacitor C and the quick-unload module 12, and a negative electrode of the electrolytic capacitor C is connected to the ground. The menu panel module 11 generates the first level when the button switch 111 is closed and outputs the first level through discharging of the electrolytic capacitor C when the button switch 111 is opened. In this embodiment, the first level is a high level.

The quick-unload module 12 is configured to acquire the first level from the menu panel module 11 in a sleep state of the DVD navigator and process the first level to generate a second level and a pulse signal so as to control the DVD navigator to quickly unload a disc according to the second level in the sleep state. In this embodiment, the second level is a high level.

As shown in FIG. 2, the quick-unload module 12 comprises a second resistor R2, a third resistor R3, a fourth resistor R4, a fifth resistor R5, a first transistor T1, a second transistor T2 and a third transistor T3. The first transistor T1 has a first pin thereof respectively connected to the other terminal of the button switch 111, the DVD module 13 and a first pin of the second transistor T2. The first transistor T1 has a second pin thereof connected to the voltage source vcc via the second resistor R2, and the DVD module 13 is connected to the second pin of the first transistor T1. The first transistor T1 has a third pin thereof connected to the ground GND via the third resistor R3. The second transistor T2 has a second pin thereof connected to the voltage source vcc via the fourth resistor R4. The second transistor T2 has a third pin thereof connected to a third pin of the third transistor T3. The third transistor T3 has a second pin thereof connected to the ground GND via the fifth resistor R5, and meanwhile, the motor module 14 is connected to the second pin of the third transistor T3. The third transistor T3 has a first pin connected to a position detection terminal 15. In this embodiment, the position detection terminal 15 is configured to detect the unload status of the DVD navigator, and the position detection terminal 15 outputs a low level when the disc has not been completely unloaded from the DVD navigator and outputs a high level when the disc has been completely unloaded from the DVD navigator.

In this embodiment, the first transistor T1 and the second transistor T2 are each an NPN transistor, and the third transistor T3 is a PNP transistor. The first pin of the first transistor T1 and the first pin of the second transistor T2 are base electrodes of the respective NPN transistors. The second pin of the first transistor T1 and the second pin of the second transistor T2 are collector electrodes of the respective NPN transistors. The third pin of the first transistor T1 and the third pin of the second transistor T2 are emitter electrodes of the respective NPN transistors. The first pin of the third transistor T3 is a base electrode of the PNP transistor, the second pin of the third transistor T3 is a collector electrode of the PNP transistor, and the third pin of the third transistor T3 is an emitter electrode of the PNP transistor.

Optionally, in another embodiment, the first transistor T1 and the second transistor T2 are each an N-type MOS transistor, and the third transistor is a P-type MOS transistor. The first pin of the first transistor T1 and the first pin of the second transistor T2 are gate electrodes of the respective N-type MOS transistors. The second pin of the first transistor T1 and the second pin of the second transistor T2 are drain electrodes of the respective N-type MOS transistors. The third pin of the first transistor T1 and the third pin of the second transistor T2 are source electrodes of the respective N-type MOS transistors. The first pin of the third transistor T3 is a gate electrode of the P-type MOS transistor, the second pin of the third transistor T3 is a drain electrode of the P-type MOS transistor, and the third pin of the third transistor T3 is a source electrode of the P-type MOS transistor.

The motor module 14 is configured to control a motor to rotate according to the second level so as to control the DVD navigator to quickly unload the disc in the sleep state.

The DVD module 13 is configured to awaken the DVD navigator when acquiring the pulse signal in the sleep state of the DVD navigator, and meanwhile, supply power to the motor module 14.

It shall be appreciated that, the DVD module 13 is further configured to, supply power to the motor module 14 when acquiring the first level from the menu panel module 11 in a normal operation state of the DVD navigator, and control rotating the motor of the motor module 14 so as to control the DVD navigator to unload the disc.

How the DVD navigator of the present disclosure works will be described in details with reference to an embodiment hereinafter.

When the DVD navigator is in the sleep state and the button switch 111 of the menu panel module 11 is closed, the other terminal of the button switch 111 generates the first level and, meanwhile, the voltage source vcc charges the electrolytic capacitor C. Then the button switch 111 is opened, the electrolytic capacitor C is discharged so that the other terminal of the button switch 111 continues to output the first level. When the first level is acquired by the quick-unload module 12 from the other terminal of the button switch 111 of the menu panel module 11, as the DVD navigator is in the sleep state, the position detection terminal 15 outputs a low level to turn on the first transistor T1, the second transistor T2 and the third transistor T3. The quick-unload module 12 generates the second level at the second pin of the third transistor T3 to the motor module 14, and then the motor module 14 is activated and controls the DVD navigator to quickly unload the disc in the sleep state. Meanwhile, the voltage change at the second pin of the first transistor T1 of the quick-unload module 12 from a low level to a high level can generate a pulse signal, which is acquired by the DVD module 13 to awaken the DVD navigator from the sleep state and supply power to the motor module 14.

When the DVD navigator is in the normal operation state and the button switch 111 of the menu panel module 11 is closed, the other terminal of the button switch 111 generates the first level and, meanwhile, the voltage source vcc charges the electrolytic capacitor C. Then the button switch 111 is opened, the electrolytic capacitor C is discharged so that the other terminal of the button switch 111 continues to output the first level. After acquiring the first level from the menu panel module 11, the DVD module 13 supplies power to the motor module 14 and controls the motor of the motor module 14 to rotate so as to control the DVD navigator to unload the disc.

Figure 3:
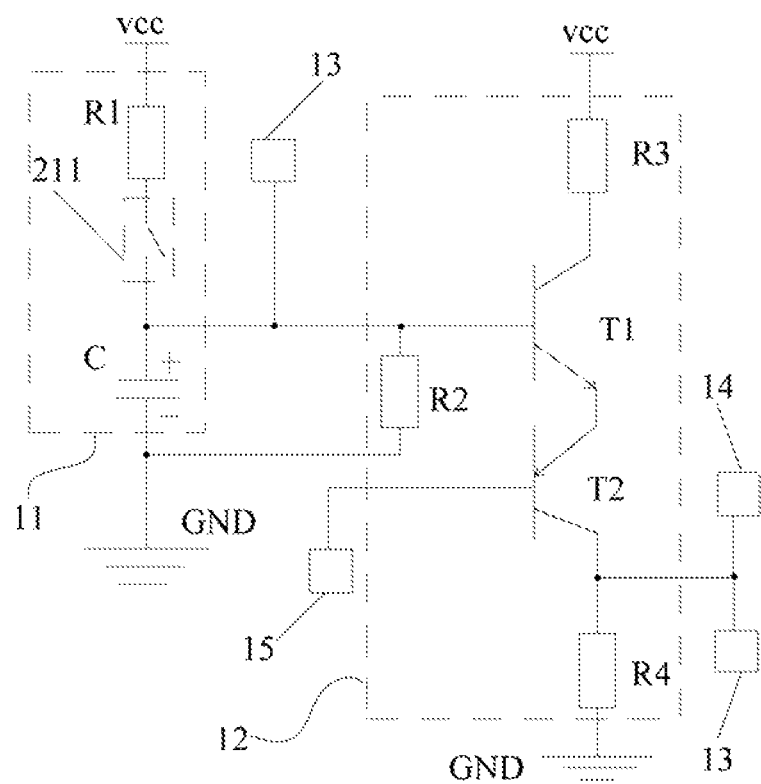
FIG. 3 is a schematic circuit diagram of a DVD navigator based on a vehicle-mounted terminal according to a second embodiment of the present disclosure.

Further, referring to FIG. 3, a schematic circuit diagram of a DVD navigator based on a vehicle-mounted terminal according to a second embodiment of the present disclosure is shown therein. The DVD navigator of FIG. 3 differs from the DVD navigator of FIG. 2 mainly in that: the quick-unload module 12 comprises a second resistor R2, a third resistor R3, a fourth resistor R4, a first transistor T1 and a second transistor T2. The first transistor T1 has a first pin thereof respectively connected to the other terminal of a button switch 211, the DVD module 13 and a terminal of the second resistor R2, and the other terminal of the second resistor R2 is connected to the ground GND. The first transistor T1 has a second pin thereof connected to the voltage source vcc via the third resistor R3. The first transistor T1 has a third pin thereof connected to a third pin of the second transistor T2, and the second transistor T2 has a second pin thereof connected to the ground GND via the fourth resistor R4. Meanwhile, the second pin of the second transistor T2 is further respectively connected to the DVD module 13 and the motor module 14. The second transistor T2 has a first pin thereof connected to the position detection terminal 15. In this embodiment, the position detection terminal 15 is configured to detect the unload status of the DVD navigator, and the position detection terminal 15 outputs a low level when the disc has not been completely unloaded from the DVD navigator and outputs a high level when the disc has been completely unloaded from the DVD navigator.

In this embodiment, the first transistor T1 is an NPN transistor, and the second transistor T2 is a PNP transistor. The first pin of the first transistor T1 is a base electrode of the NPN transistor, the second pin of the first transistor T1 is a collector electrode of the NPN transistor, and the third pin of the first transistor T1 is an emitter electrode of the NPN transistor. The first pin of the second transistor T2 is a base electrode of the PNP transistor, the second pin of the second transistor T2 is a collector electrode of the PNP transistor, and the third pin of the second transistor T2 is an emitter electrode of the PNP transistor.

Optionally, in another embodiment, the first transistor T1 is an N-type MOS transistor, and the second transistor T2 is a P-type MOS transistor. The first pin of the first transistor T1 is a gate electrode of the N-type MOS transistor, the second pin of the first transistor T1 is a drain electrode of the N-type MOS transistor, and the third pin of the first transistor T1 is a source electrode of the N-type MOS transistor. The first pin of the second transistor T2 is a gate electrode of the P-type MOS transistor, the second pin of the second transistor T2 is a drain electrode of the P-type MOS transistor, and the third pin of the second transistor T2 is a source electrode of the P-type MOS transistor.

How the DVD navigator of the present disclosure works will be described in details in conjunction with an embodiment hereinafter.

When the DVD navigator is in the sleep state and the button switch 211 of the menu panel module 11 is closed, the other terminal of the button switch 211 generates the first level and, meanwhile, the voltage source vcc charges the electrolytic capacitor C. After the button switch 211 is opened, the electrolytic capacitor C is discharged so that the other terminal of the button switch 211 continues to output the first level. When the first level is acquired by the quick-unload module 12 from the other terminal of the button switch 211 of the menu panel module 11, as the DVD navigator is in the sleep state, the position detection terminal 15 outputs a low level and the first transistor T1 and the second transistor T2 are turned on. The voltage at the second pin of the second transistor T2 of the quick-unload module 12 changes from a low level to a high level, so a pulse signal and the second level are respectively generated at the second pin of the second transistor T2 by the quick-unload module 12. Then the second level is acquired by the motor module 14 from the second pin of the second transistor T2 to control the DVD navigator to quickly unload the disc in the sleep state. Meanwhile, the pulse signal is acquired by the DVD module 13 from the second pin of the second transistor T2 to awaken the DVD navigator in the sleep state and supply power to the motor module 14.

On the other way, when the DVD navigator is in the normal operation state and the button switch 211 of the menu panel module 11 is closed, the other terminal of the button switch 211 generates the first level and, meanwhile, the voltage source vcc charges the electrolytic capacitor C. After the button switch 211 is opened, the electrolytic capacitor C is discharged so that the other terminal of the button switch 211 continues to output the first level. After acquiring the first level from the menu panel module 11, the DVD module 13 supplies power to the motor module 14 and controls the motor of the motor module 14 to rotate so as to control the DVD navigator to unload the disc.

According to the above descriptions, the DVD navigator of the present disclosure comprises a menu panel module, a quick-unload module, a DVD module and a motor module. When the DVD navigator is in the sleep state, the menu panel module generates a first level in response to reception of an unload instruction. Then the quick-unload module acquires the first level and processes the first level to generate a second level and a pulse signal. The motor module controls the DVD navigator to quickly unload a disc according to the second level, and meanwhile, the DVD module acquires the pulse signal to awaken the DVD navigator from the sleep state and supply power to the motor module. On the other way, when the DVD navigator is in the normal operation state, the menu panel module generates a first level in response to reception of an unload instruction, and the DVD module processes the first level to generate a second level to the motor module and meanwhile supplies power to the motor module. Then the motor module controls the DVD navigator to quickly unload the disc according to the second level. Thus, the DVD navigator of the present disclosure can quickly unload a disc either in the sleep state or in the normal operation state after receiving the unload instruction so that the unload time of the DVD navigator can be effectively reduced and the user experiences can be significantly improved.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A digital versatile disc (DVD) navigator, comprising:
   a menu panel module, configured to generate a first level in response to reception of an unload instruction;
   a quick-unload module, configured to acquire and process the first level in a sleep state of the DVD navigator to generate a second level and a pulse signal; wherein the quick-unload module is controlled according to the second level to quickly unload a disc in the sleep state;
   a motor module, configured to control a motor to rotate according to the second level for controlling the quick-unload module to quickly unload the disc in the sleep state;
   a DVD module, configured to awaken the DVD navigator after acquiring the pulse signal in the sleep state of the DVD navigator, and to supply power to the motor module;
   wherein the menu panel module comprises a first resistor, a button switch and an electrolytic capacitor; wherein the button switch comprises a first terminal connected to a voltage source via the first resistor, and a second terminal respectively connected to a positive electrode of the electrolytic capacitor and the quick-unload module, and a negative electrode of the electrolytic capacitor is connected to the ground; and
   wherein the menu panel module generates the first level when the button switch is closed, and the menu panel module outputs the first level through discharging of the electrolytic capacitor when the button switch is opened.

2. The DVD navigator of claim 1, wherein the quick-unload module comprises a second resistor, a third resistor, a fourth resistor, a fifth resistor, a first transistor, a second transistor and a third transistor;
   wherein the first transistor comprises a first pin respectively connected to the second terminal of the button switch and a first pin of the second transistor, a second pin connected to the voltage source by the second resistor, and a third pin connected to the ground by the third resistor;

the second transistor comprises a second pin connected to the voltage source by the fourth resistor and a third pin connected to a third pin of the third transistor;

the third transistor comprises a first pin connected to a position detection terminal, and a second pin connected to the ground by the fifth resistor; and wherein the position detection terminal outputs a low level when the disc has not been completely unloaded from the DVD navigator, and outputs a high level when the disc has been completely unloaded from the DVD navigator;

wherein the DVD module is connected to the second pin of the first transistor, and the motor module is connected to the second pin of the third transistor;

when the quick-unload module acquiring the first level from the menu panel module, the first transistor, the second transistor and the third transistor are turned on, and the DVD module acquires the pulse signal from the second pin of the first transistor to awaken the DVD navigator, and supplies power to the motor module; and the quick-unload module generates the second level at the second pin of the third transistor to the motor module for controlling the DVD navigator to quickly unload the disc in the sleep state.

3. The DVD navigator of claim 2, wherein the DVD module is further connected to the first pin of the first transistor, when the DVD module acquiring the first level from the menu panel module, the DVD module supplies power to the motor module and controls the motor of the motor module to rotate for unloading the disc.

4. The DVD navigator of claim 2, wherein each of the first transistor and the second transistor is an NPN transistor, and the third transistor is a PNP transistor;

wherein the first pin of the first transistor and the first pin of the second transistor are base electrodes, the second pin of the first transistor and the second pin of the second transistor are collector electrodes, and the third pin of the first transistor and the third pin of the second transistor are emitter electrodes; and wherein the first pin of the third transistor is a base electrode of the PNP transistor, the second pin of the third transistor is a collector electrode of the PNP transistor, and the third pin of the third transistor is an emitter electrode of the PNP transistor.

5. The DVD navigator of claim 2, wherein each of the first transistor and the second transistor is an N-type MOS transistor, and the third transistor is a P-type MOS transistor;

wherein the first pin of the first transistor and the first pin of the second transistor are gate electrodes, the second pin of the first transistor and the second pin of the second transistor are drain electrodes, and the third pin of the first transistor and the third pin of the second transistor are source electrodes; and wherein the first pin of the third transistor is a gate electrode of the P-type MOS transistor, the second pin of the third transistor is a drain electrode of the P-type MOS transistor, and the third pin of the third transistor is a source electrode of the P-type MOS transistor.

6. The DVD navigator of claim 1, wherein the quick-unload module comprises a second resistor, a third resistor, a fourth resistor, a first transistor and a second transistor;

wherein the first transistor comprises a first pin connected to the second terminal of the button switch and a first terminal of the second resistor, a second pin connected to the voltage source via the third resistor, and a third pin connected to a third pin of the second transistor, wherein a second terminal of the second resistor is connected to the ground;

the second transistor further comprises a second pin connected to the ground via the fourth resistor, and a first pin connected to a position detection terminal; and the position detection terminal outputs a low level when the disc has not been completely unloaded from the DVD navigator and outputs a high level when the disc has been completely unloaded from the DVD navigator;

wherein the second pin of the second transistor is respectively connected to the DVD module and the motor module;

when the quick-unload module acquiring the first level from the menu panel module, the first transistor and the second transistor are turned on, and the DVD module acquires the pulse signal from the second pin of the second transistor to awaken the DVD navigator, and supplies power to the motor module; and the second pin of the second transistor generates the second level to the motor module for controlling the DVD navigator to quickly unload the disc in the sleep state.

7. The DVD navigator of claim 6, wherein the DVD module is further connected to the first pin of the first transistor, and when the DVD module acquiring the first level from the menu panel module, the DVD module supplies power to the motor module and controls the motor of the motor module to rotate for unloading the disc.

8. The DVD navigator of claim 7, wherein the first transistor is an NPN transistor, and the second transistor is a PNP transistor;

wherein the first pin of the first transistor is a base electrode, the second pin of the first transistor is a collector electrode, and the third pin of the first transistor is an emitter electrode; and wherein the first pin of the second transistor is a base electrode, the second pin of the second transistor is a collector electrode, and the third pin of the second transistor is an emitter electrode.

9. The DVD navigator of claim 8, wherein the first transistor is an N-type MOS transistor, and the second transistor is a P-type MOS transistor;

wherein the first pin of the first transistor is a gate electrode, the second pin of the first transistor is a drain electrode, and the third pin of the first transistor is a source electrode; and wherein the first pin of the second transistor is a gate electrode, the second pin of the second transistor is a drain electrode, and the third pin of the second transistor is a source electrode.

10. A digital versatile disc (DVD) navigator, comprising a menu panel module, a quick-unload module, a DVD module and a motor module, wherein:

the quick-unload module is configured to control the motor module to unload a disc in response to reception of an unloading instruction by the menu panel module when the DVD navigator is in a sleep state; and the DVD module is configured to control the motor module to unload the disc in response to reception of the unloading instruction by the menu panel module when the DVD navigator is in a normal operation state, the DVD module is configured to awaken the DVD navigator in the sleep state and supply power to the motor module in the sleep state and the normal operation state;

wherein: the menu panel module is configured to generate a first level in response to reception of the unloading instruction;

the quick-unload module is configured to acquire the first level and process the first level to generate a second level and a pulse signal;

the motor module is configured to control a motor to rotate according to the second level for controlling the DVD navigator to quickly unload the disc in the sleep state; and the DVD module is configured to awaken the DVD navigator after acquiring the pulse signal and supply power to the motor module in the sleep state, and the DVD module is further configured to supply power to the motor module and control the motor of the motor module to rotate in response to reception of the first level for unloading the disc in the normal operation state.

11. The DVD navigator of claim 10, wherein the menu panel module comprises a first resistor, a button switch and an electrolytic capacitor;

wherein the button switch comprises a first terminal connected to a voltage source via the first resistor, and a second terminal respectively connected to a positive electrode of the electrolytic capacitor and the quick-unload module, and a negative electrode of the electrolytic capacitor is connected to the ground; and wherein the menu panel module generates the first level when the button switch is closed, and the menu panel module outputs the first level through discharging of the electrolytic capacitor when the button switch is opened.

12. The DVD navigator of claim 11, wherein the quick-unload module comprises a second resistor, a third resistor, a fourth resistor, a fifth resistor, a first transistor, a second transistor and a third transistor;

wherein the first transistor comprises a first pin respectively connected to the second terminal of the button switch and a first pin of the second transistor, a second pin connected to the voltage source by the second resistor, and a third pin connected to the ground by the third resistor;

the second transistor comprises a second pin connected to the voltage source by the fourth resistor and a third pin connected to a third pin of the third transistor;

the third transistor comprises a first pin connected to a position detection terminal, and a second pin connected to the ground by the fifth resistor; and wherein the position detection terminal outputs a low level when the disc has not been completely unloaded from the DVD navigator, and outputs a high level when the disc has been completely unloaded from the DVD navigator, wherein the DVD module is connected to the second pin of the first transistor, and the motor module is connected to the second pin of the third transistor;

when the quick-unload module acquiring the first level from the menu panel module, the first transistor, the second transistor and the third transistor are turned on, and the DVD module acquires the pulse signal from the second pin of the first transistor to awaken the DVD navigator, and supplies power to the motor module; and the quick-unload module generates the second level at the second pin of the third transistor to the motor module for controlling the DVD navigator to quickly unload the disc in the sleep state.

13. The DVD navigator of claim 11, wherein the quick-unload module comprises a second resistor, a third resistor, a fourth resistor, a first transistor and a second transistor;

wherein the first transistor comprises a first pin connected to the second terminal of the button switch and a first terminal of the second resistor, a second pin connected to the voltage source via the third resistor, and a third pin connected to a third pin of the second transistor, wherein a second terminal of the second resistor is connected to the ground;

the second transistor further comprises a second pin connected to the ground via the fourth resistor, and a first pin connected to a position detection terminal; and the position detection terminal outputs a low level when the disc has not been completely unloaded from the DVD navigator and outputs a high level when the disc has been completely unloaded from the DVD navigator;

wherein the second pin of the second transistor is respectively connected to the DVD module and the motor module;

when the quick-unload module acquiring the first level from the menu panel module, the first transistor and the second transistor are turned on, and the DVD module acquires the pulse signal from the second pin of the second transistor to awaken the DVD navigator, and supplies power to the motor module; and the second pin of the second transistor generates the second level to the motor module for controlling the DVD navigator to quickly unload the disc in the sleep state.

* * * * *